(12) United States Patent
Um et al.

(10) Patent No.: US 11,454,850 B2
(45) Date of Patent: Sep. 27, 2022

(54) PIXEL ELECTRODE AND DISPLAY PANEL

(71) Applicant: TCL CHINA STAR OPTOELECTRONICS TECHNOLOGY CO., LTD., Guangdong (CN)

(72) Inventors: Yoonsung Um, Guangdong (CN); Kaili Qu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 145 days.

(21) Appl. No.: 16/765,221

(22) PCT Filed: Mar. 19, 2020

(86) PCT No.: PCT/CN2020/080252
§ 371 (c)(1),
(2) Date: May 19, 2020

(87) PCT Pub. No.: WO2021/128612
PCT Pub. Date: Jul. 1, 2021

(65) Prior Publication Data
US 2021/0405469 A1    Dec. 30, 2021

(30) Foreign Application Priority Data

Dec. 26, 2019  (CN) .......................... 201911361659.9

(51) Int. Cl.
*G02F 1/1343* (2006.01)
(52) U.S. Cl.
CPC .............................. *G02F 1/134345* (2021.01)

(58) Field of Classification Search
CPC ............. G02F 1/1343; G02F 1/134309; G02F 1/134345; G02F 1/133753; G02F 1/133757
USPC ................................ 349/129, 130, 139, 144
See application file for complete search history.

(56) References Cited

U.S. PATENT DOCUMENTS

| | | | |
|---|---|---|---|
| 8,035,787 B2 * | 10/2011 | Jung ................. | G02F 1/134336 349/141 |
| 8,638,403 B2 | 1/2014 | Yoshida et al. | |
| 9,709,858 B2 | 7/2017 | Jung et al. | |
| 2012/0236245 A1 * | 9/2012 | Jung ................. | G02F 1/134336 349/144 |

(Continued)

FOREIGN PATENT DOCUMENTS

| CN | 101387803 A | 3/2009 |
|---|---|---|
| CN | 101738802 A | 6/2010 |

(Continued)

OTHER PUBLICATIONS

International Search Report dated Oct. 10, 2020; PCT/CN2020/080252.

*Primary Examiner* — Edward J Glick
*Assistant Examiner* — David Y Chung

(57) ABSTRACT

A pixel electrode and a display panel are provided. The pixel electrode includes a sub-pixel region and a main pixel region arranged at intervals. The sub-pixel region includes a first sub-pixel region and a second sub-pixel region, wherein a receiving chamber is formed between the first sub-pixel region and the second sub-pixel region, and the main pixel region is disposed in the receiving chamber.

11 Claims, 11 Drawing Sheets

(56) References Cited

U.S. PATENT DOCUMENTS

2013/0044094 A1     2/2013   Li et al.
2016/0011469 A1     1/2016   Jung et al.
2016/0116809 A1     4/2016   Jung et al.

FOREIGN PATENT DOCUMENTS

| | | |
|---|---|---|
| CN | 102314032 A | 1/2012 |
| CN | 102393589 A | 3/2012 |
| CN | 105137674 A | 12/2015 |
| CN | 106200146 A | 12/2016 |
| CN | 107589602 A | 1/2018 |
| CN | 109581760 A | 4/2019 |
| KR | 20110038827 A | 4/2011 |

\* cited by examiner

PIXEL ELECTRODE AND DISPLAY PANEL

FIELD OF INVENTION

The present invention relates to the field of display technology, and in particular, to a pixel electrode and a display panel.

BACKGROUND OF INVENTION

As shown in FIG. 1 and FIG. 2, current pixel electrode generally includes a main pixel region 101 and a sub-pixel region 102, and the main pixel region 101 is positioned above the sub-pixel region 102. During a driving process of panel, an upper substrate 20 is provided with a common electrode 21, and a lower substrate 10 is provided with a peripheral electrode 11 and a pixel electrode 12. Taking the sub-pixel region as an example, liquid crystal molecules in the sub-pixel region 102 are rapidly tilted under a common action of electric field generated by the peripheral electrode 11, the common electrode 21, and the pixel electrode 12 (the same applies to the main pixel region).

Technical Problem

However, as size of display panel increases, a distance from outside to inside increases. Taking the sub-pixel region as an example, a force of the electric field between the peripheral electrode 11 and the pixel electrode in the sub-pixel region 102 acting on the liquid crystal molecules is weakened so that the liquid crystal molecules in a middle region of the panel affected only by the electric field between the common electrode 21 and the pixel electrode 12 (a tilting direction is shown by the arrow in FIG. 2) are tilted slowly. That is, as a size of product increases, a size of pixel increases, and thus, a proportion of the liquid crystal molecules affected by the electric field between the common electrode 21 and the peripheral electrode 11 decreases, which increases response time. For example, the response times of 55-inch, 65-inch, and 75-inch display panels at a same resolution are 12 ms, 14.7 ms, and 15.7 ms, respectively.

Therefore, it is necessary to provide a pixel electrode and a display panel to solve the problems existing in the prior art.

SUMMARY OF INVENTION

An object of the present invention is to provide a pixel electrode and a display panel, which can shorten response time.

To solve the above technical problems, the present invention provides a pixel electrode. The pixel electrode includes a sub-pixel region and a main pixel region arranged at intervals, and the sub-pixel region includes a first sub-pixel region and a second sub-pixel region, wherein a receiving chamber is formed between the first sub-pixel region and the second sub-pixel region, and the main pixel region is defined in the receiving chamber.

The present invention also provides a display panel including the pixel electrode described above.

BENEFICIAL EFFECT

The pixel electrode and the display panel of the present invention include a sub-pixel region and a main pixel region arranged at intervals. The sub-pixel region includes a first sub-pixel region and a second sub-pixel region, wherein a receiving chamber is formed between the first sub-pixel region and the second sub-pixel region, and the main pixel region is disposed in the receiving chamber. The sub-pixel region is positioned on both sides of the main pixel region, and there is a voltage difference between the main pixel region and the sub-pixel region so that the liquid crystal molecules in the middle region are not only affected by the electric field between the common voltage of the upper substrate and the pixel electrode, but also by the electric field between the main pixel region and the sub-pixel region. Therefore, the tilting speed of the liquid crystal molecules is increased, the response time is shortened, and the viewing angles are also improved to improve the display effect.

DETAILED DESCRIPTION OF PREFERRED EMBODIMENTS

Figure 1:
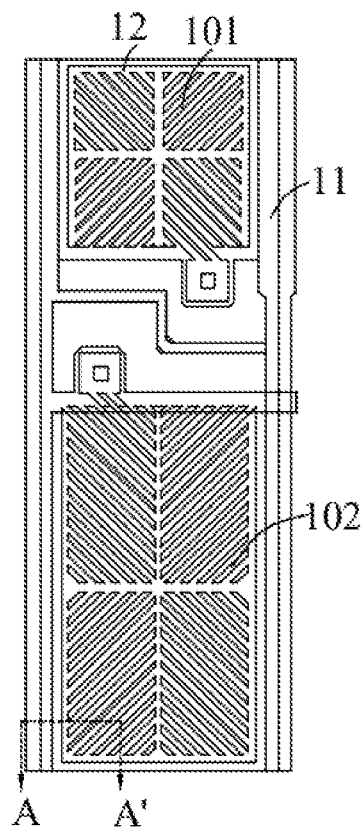
FIG. 1 is a top view of a conventional pixel.

The following descriptions of the embodiments are with reference to the attached drawings to illustrate specific embodiments in which the present invention can be implemented. The directional terms mentioned in the present invention, such as "up", "down", "front", "rear", "left", "right", "inside", "outside", "side", etc., are only directions referring to the attached drawings. Therefore, the directional terms used are for explaining and understanding the present invention, but not for limiting the present invention. In the drawings, similarly structured units are denoted by the same reference numerals.

The terms "first", "second", and the like in the description and claims of the present application and the drawings are used to distinguish different objects, and are not used to describe a specific order. In addition, the terms "comprising"

and "including" and any variations thereof are intended to cover a non-exclusive inclusion.

Figure 2:
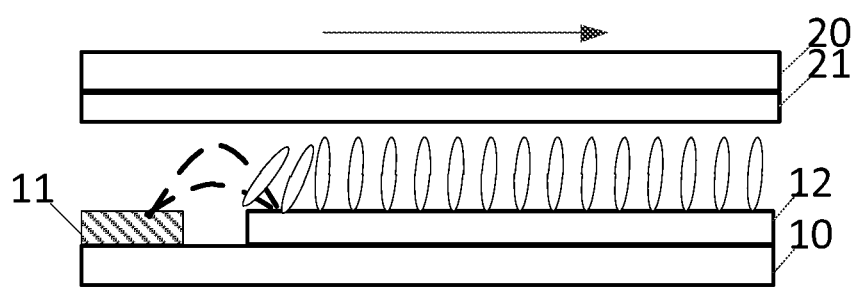
FIG. 2 is a cross-sectional view taken along AA' direction in FIG. 1.

As shown in FIG. 1 and FIG. 2, a peripheral electrode 11 (DBS, data BM less) is used to shield electrodes on the data line. A voltage of the peripheral electrode 11 is generally consistent with a common voltage ($CF_{com}$) 21 of an upper substrate 20, for example, 7V. For example, at a grayscale of 255, a voltage of a main pixel region 101 of a pixel electrode 12 is generally set to 15V, and a voltage of the sub-pixel region 102 is 13V.

The main pixel region 101 and the sub-pixel region 102 include two cross-shaped body portions. Therefore, in a region corresponding to the body portions and a gap between the main pixel region and the sub-pixel region, dark streaks are prone to occur, resulting in lower efficiency of liquid crystals.

Figure 3:
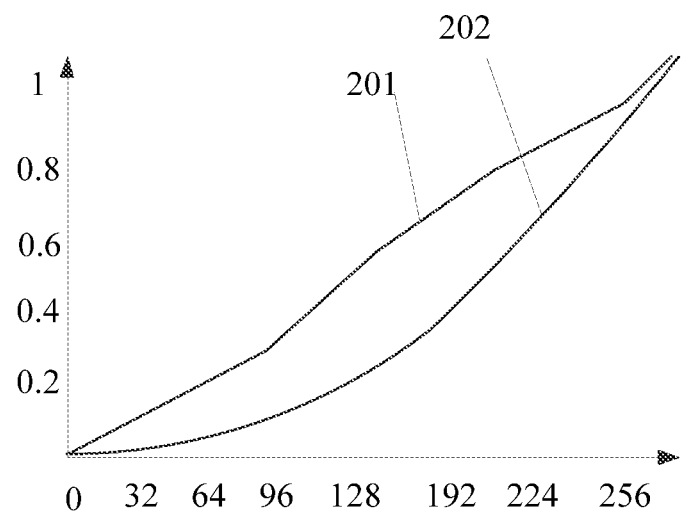
FIG. 3 is a relationship graph regarding a current grayscale transmittance.

Compared with a display panel with 4 display domains, a display panel with 8 display domains can improve viewing angles to a certain extent. However, the panel will still have a washout phenomenon at wide viewing angles, which reduces display effect. As shown in FIG. 3, abscissa represents grayscale and ordinate represents transmittance, but there is a deviation between a grayscale penetration curve 202 in a side view (such as 60 degrees) and a grayscale penetration curve 201 in a front view. That is to say, a distortion degree of gamma curve is relatively serious, which causes the panel to have the washout phenomenon under wide viewing angles, thus making display effect worse.

Figure 4:
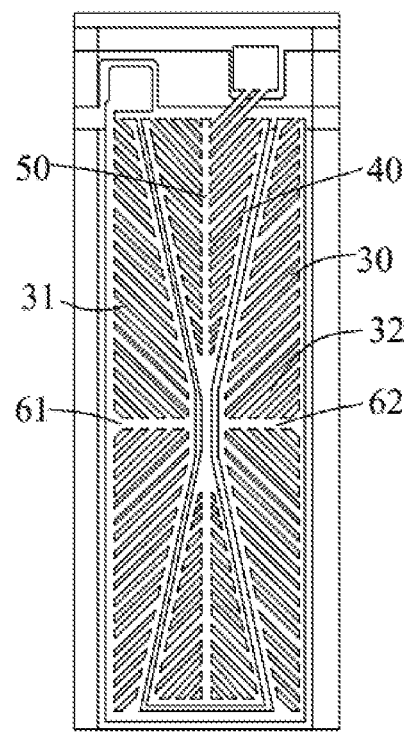
FIG. 4 is a top view of a pixel according to a first embodiment of the present invention.
Figure 5:
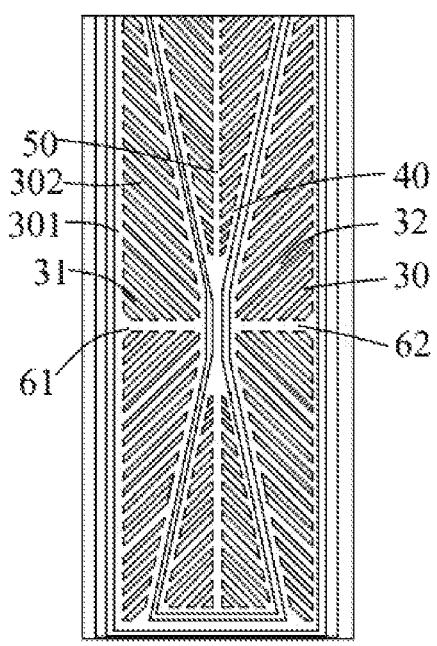
FIG. 5 is a top view of a pixel electrode according to the first embodiment of the present invention.

Please refer to FIG. 4 and FIG. 5. FIG. 4 is a top view of a pixel according to a first embodiment of the present invention.

As shown in FIG. 4, the pixel in the embodiment includes a pixel electrode, and the pixel electrode includes a sub-pixel region 30 and a main pixel region 40 disposed at intervals.

The sub-pixel region 30 includes a first sub-pixel region 31 and a second sub-pixel region 32. In one embodiment, a first end (bottom end) of the first sub-pixel region 31 and a first end (bottom end) of the second sub-pixel region 32 are connected, a second end (top end) of the first sub-pixel region 31 and a second end (top end) of the second sub-pixel region 32 are not connected, and the first end of the first sub-pixel region 31 and the first end of the second sub-pixel region 32 are opposite to each other.

A receiving chamber (not shown) is formed between the first sub-pixel region 31 and the second sub-pixel region 32. The main pixel region 40 is defined in the receiving chamber. That is, the main pixel region 40 is disposed between the first sub-pixel region 31 and the second sub-pixel region 32. In one embodiment, the first sub-pixel region 31 is positioned on a left side of the main pixel region 40, and the second sub-pixel region 32 is positioned on a right side of the main pixel region 40.

With reference to FIG. 5, the left side, right side, and lower side of the first sub-pixel region 31, the second sub-pixel region 32, and the main pixel region 40 are closed structures. Above the first sub-pixel region 31, the second sub-pixel region 32, and the main pixel region 40 are open structures. Specifically, taking the first sub-pixel region 31 as an example, the first sub-pixel region 31 includes a peripheral portion 301 (equivalent to a frame) and a branch portion 302 provided in the peripheral portion 301. The peripheral portion 301 has a cavity, and the branch portion 302 is positioned in the cavity. The peripheral portion 301 surrounds the left side, right side, and lower side of the branch portion 302, and the peripheral portion 302 is not provided on an outer side above the branch portion 302. It can be understood that the second sub-pixel region 32 and the main pixel region 40 are like this, and will not be repeated herein.

The pixel electrode further includes a first body portion 50 and a second body portion 60. The first body portion 50 and the second body portion 60 are intersected. In one embodiment, the first body portions 50 are arranged in a longitudinal direction, the second body portions 60 are arranged in a horizontal direction, and the first body portions 50 are positioned in the main pixel region 40. In the embodiment, the entire second body portion 60 is positioned in the sub-pixel region 30. In one embodiment, the second body portion 60 may include a first sub-portion 61 and a second sub-portion 62. The first sub-portion 61 is positioned in the first sub-pixel region 31 and the sub-portion 62 is positioned in the second sub-pixel region 32.

In one embodiment, the main pixel region 40 is symmetrical with respect to the first body portion 50 or the second body portion 60, and the first sub-pixel region 31 and the second sub-pixel region 32 are symmetrical with respect to the first body portion 50.

In one embodiment, an area of the main pixel region 40 is less than or equal to a sum of an area of the first sub-pixel region 31 and an area of the second sub-pixel region 32. In order to make the electric field distribution more uniform, the areas of the first sub-pixel region 31 and the second sub-pixel region 32 are equal.

Figure 6:
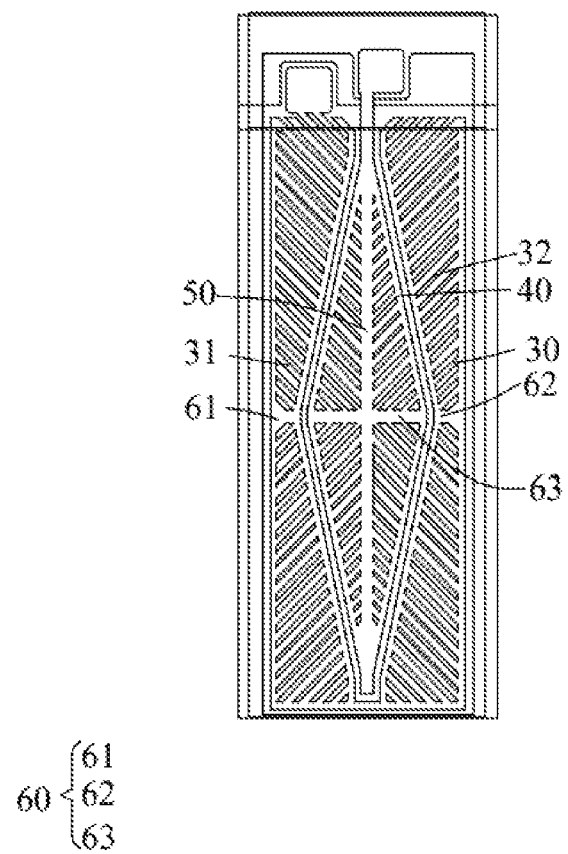
FIG. 6 is a first plan view of a pixel according to a second embodiment of the present invention.
Figure 7:
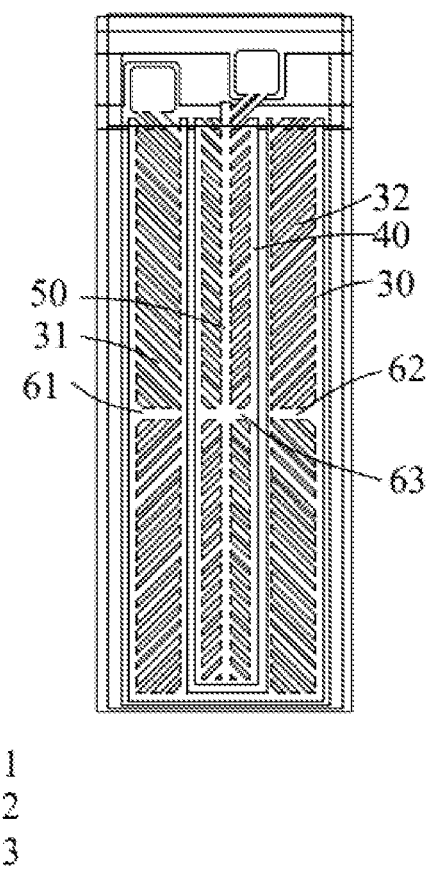
FIG. 7 is a second plan view of a pixel according to the second embodiment of the present invention.

Please refer to FIG. 6 and FIG. 7. FIG. 6 is a first plan view of a pixel according to a second embodiment of the present invention.

As shown in FIG. 6 and FIG. 7, the pixel electrode of the present embodiment is different from the previous embodiment in that a part of the second body portion 60 is positioned in the main pixel region 40.

The second body portion 60 in the present embodiment further includes a third sub-portion 63, and the third sub-portion 63 is positioned in the main pixel region 40.

In one embodiment, as shown in FIG. 6, a shape of the main pixel region 40 is rhombic.

In another embodiment, as shown in FIG. 7, the shape of the main pixel region 40 is rectangular, and shapes of the first sub-pixel region 31 and the second sub-pixel region 32 are also rectangular. An area of the main pixel region 40 is equal to an area of the first sub-pixel region 31, or an area of the main pixel region 40 is equal to an area of the second sub-pixel area 32. That is, the areas of the main pixel region 40, the first sub-pixel region 31, and the second sub-pixel region 32 are equal so that the electric field distribution is more uniform, thereby improving the display effect.

Figure 8:
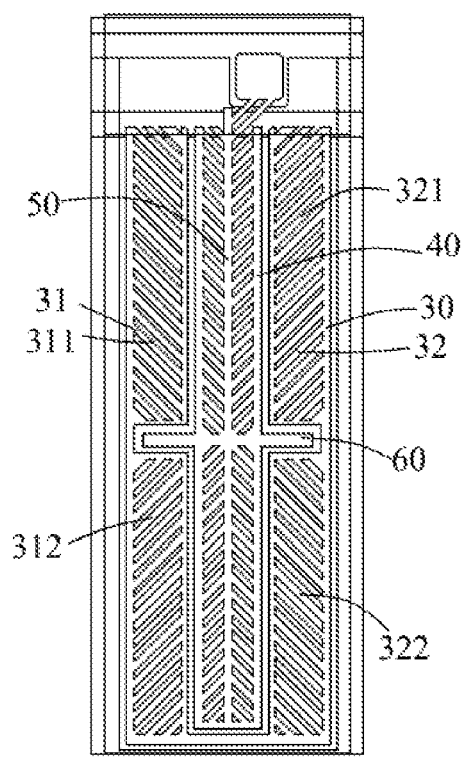
FIG. 8 is a first plan view of a pixel according to a third embodiment of the present invention.
Figure 9:
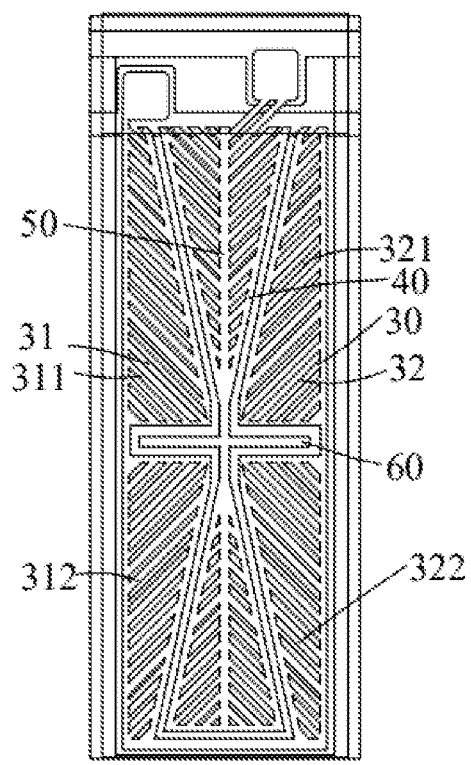
FIG. 9 is a second plan view of a pixel according to the third embodiment of the present invention.

Please refer to FIG. 8 to FIG. 11. FIG. 8 is a first plan view of a pixel according to a third embodiment of the present invention.

As shown in FIG. 8 to FIG. 11, the pixel electrode of the embodiment is different from the first embodiment in that the entire second body portion 60 is positioned in the main pixel region 40.

The first sub-pixel region includes a main sub-region 311 and a secondary sub-region 312, and the second sub-pixel region 32 also includes a main sub-region 321 and a secondary sub-region 322. The main sub-regions 311 and 321 are disposed above the second main body 60, and the secondary sub-regions 312 and 322 are disposed below the second main body 60. The main sub-region 311 and the secondary sub-region 312 are connected to each other, and the main sub-region 321 and the secondary sub-region 322 are connected to each other.

Figure 11:
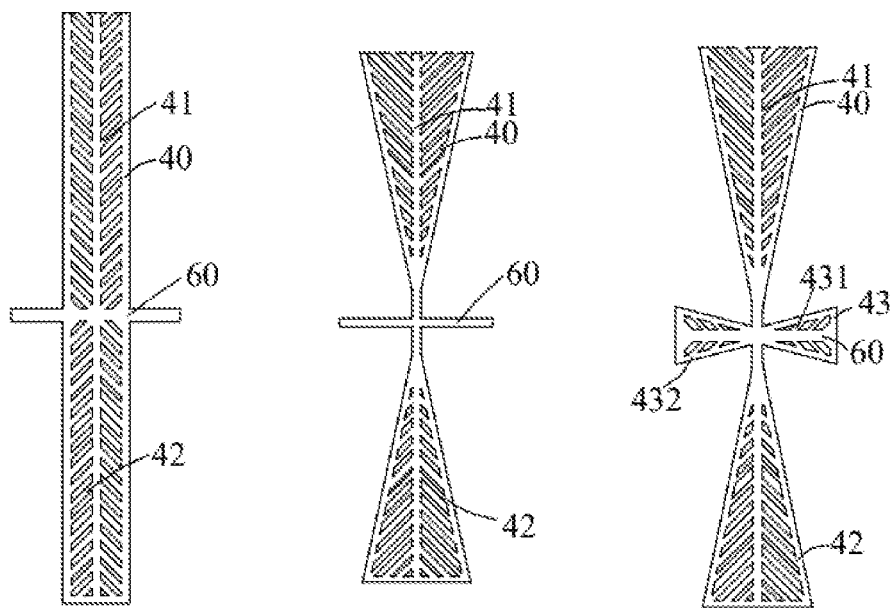
FIG. 11 is a top view of a main pixel region according to the third embodiment of the present invention.

With reference to FIG. 11, the main pixel region 40 includes a first sub-area 41 and a second sub-area 42, and the first sub-region 41 is disposed above the second body portion 60. The second sub-region 42 is disposed below the second body portion 60.

Figure 10:
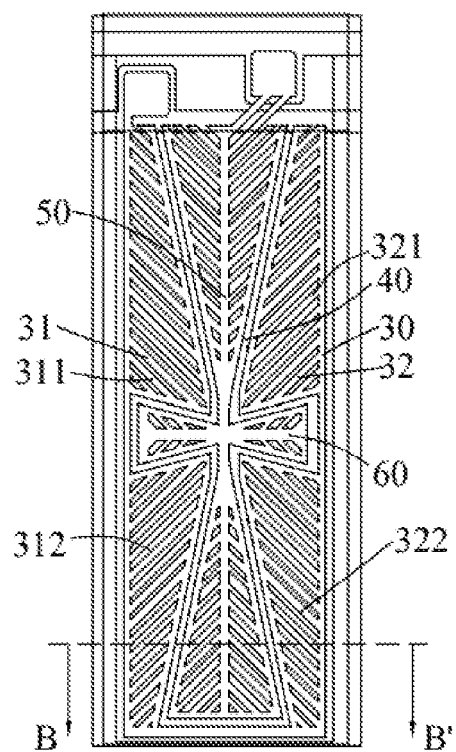
FIG. 10 is a third plan view of a pixel according to a third embodiment of the present invention.

In one embodiment, in combination with FIG. 10 and FIG. 11, the main pixel region 40 may further include a third sub-region 43. The third sub-region 43 includes a second body portion 60, a plurality of branch portions 431, and a peripheral portion 432. One end of the branch portion 431 is connected to the second body portion 60, and the peripheral portion 432 surrounds the second body portion 60 and the plurality of branch portions 431. That is, the third sub-region 43 is a closed structure.

Figure 12:
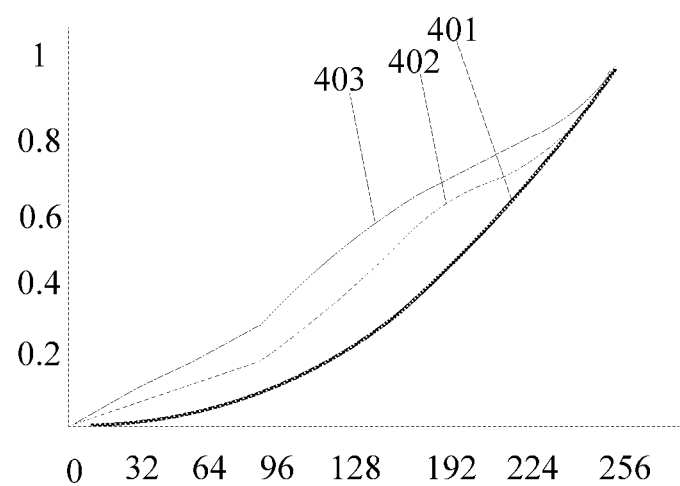
FIG. 12 is a relationship curve of grayscale transmittance of the present invention.

As shown in FIG. 12, the abscissa represents grayscale, and the ordinate represents transmittance. Number 401 represents a grayscale transmittance relationship curve when viewed in front. Number 402 represents a grayscale transmittance relationship curve of a pixel in the present invention when viewed from a side (for example, an angle of 60 degrees). Number 403 represents a grayscale transmittance relationship curve of a pixel in the prior art when viewed from a side (for example, an angle of 60 degrees). By comparison, it can be found that the pixel of the present invention can reduce the difference between the grayscale transmittance relationship curve when viewed from the side and the grayscale transmittance relationship curve when viewed from the front, thereby improving the display effect.

Figure 13:
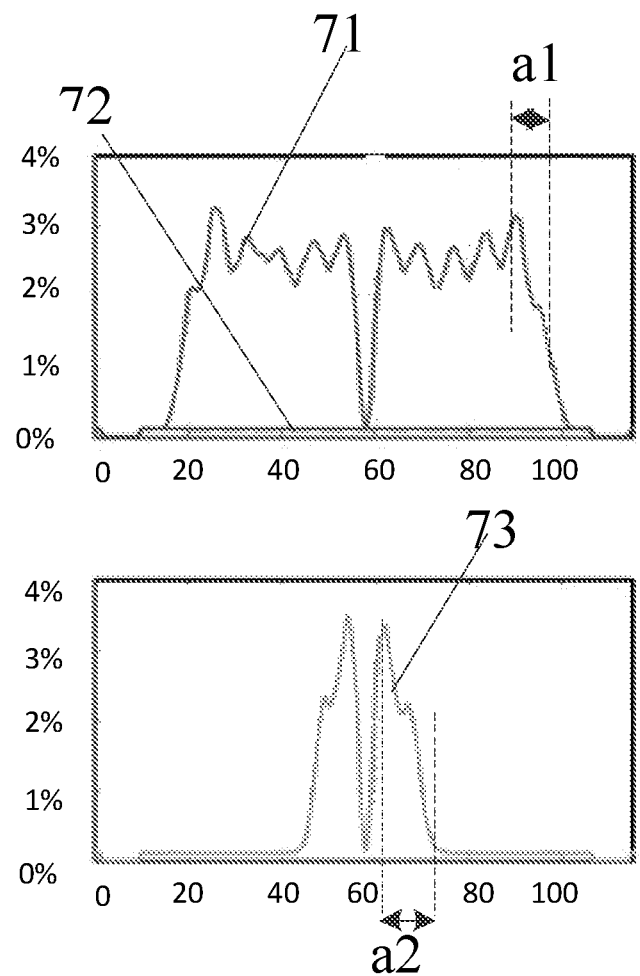
FIG. 13 is a graph showing transmittance curves of a pixel electrode of the present invention and a current pixel electrode at different positions when a low grayscale is displayed.
Figure 14:
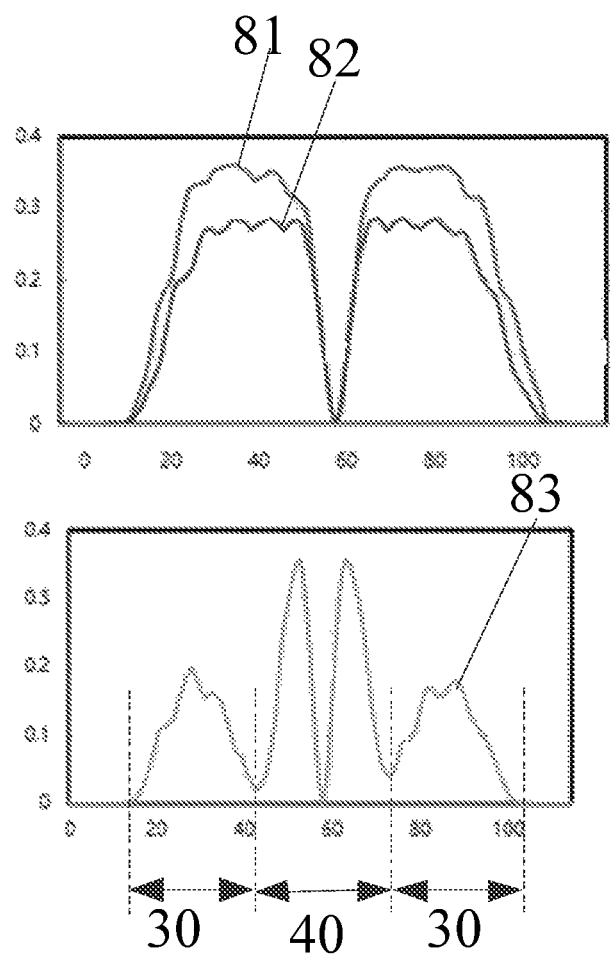
FIG. 14 is a graph showing the transmittance curves of the pixel electrode of the present invention and the current pixel electrode at different positions when an intermediate grayscale is displayed.

As shown in FIG. 13 and FIG. 14, the abscissa represents a width of the pixel, and the ordinate represents the transmittance. Number 71 represents the transmittance of the current main pixel region in the cross-sectional direction (the same as BB' direction shown in FIG. 10), number 72 represents the transmittance of the current sub-pixel region in the cross-sectional direction, and number 73 represents the transmittance of the pixel electrode of the present invention in a cross-sectional direction (for example, a cross-section in BB' direction in FIG. 10). As shown in FIG. 13, when displaying a low grayscale, a ratio of liquid crystal deflection state in the current main pixel region is stable (the differences in the tilt angles of the liquid crystals in the main pixel region is small) so that a ratio of liquid crystals in an intermediate deflection state is small. The liquid crystals in the intermediate deflection state are liquid crystals between maximum deflection angles and minimum deflection angles, that is, liquid crystal molecules between a maximum transmission rate and a minimum transmission rate.

The deflection state of the liquid crystals of the present invention changes greatly. By comparison, it can be found that the ratio a2 of the liquid crystals in the intermediate deflection state in the present invention is greater than the ratio a1 of the liquid crystals in the intermediate deflection state in the prior art. That is, a number of liquid crystal molecules in the intermediate deflection state in the present invention is greater so that the viewing angles and display effect can be improved.

When displaying intermediate grayscale, as shown in FIG. 14, number 81 represents the transmittance of the current main pixel region in the cross-sectional direction, and number 82 represents the transmittance of the current sub-pixel region in the cross-sectional direction. The difference in transmittance between the current main pixel region and the sub-pixel region is less, and it can be seen there is less diversity in the transmittance of liquid crystal molecules in the current main pixel region and sub-pixel region. Number 83 represents the transmittance of the pixel electrode of the present invention in the cross-sectional direction. It can be seen the transmittance of the liquid crystal molecules in the main pixel region 40 and the sub-pixel region 30 of the present invention is more diverse, thereby effectively improving the viewing angles.

Because a sub-pixel region of the present invention includes a first sub-pixel region and a second sub-pixel region, and a main pixel region is disposed between the first sub-pixel region and the second sub-pixel region, and because voltage difference exists between the main pixel region and the sub-pixel region, the liquid crystal molecules in the middle region are not only affected by the common voltage of the upper substrate and the electric field between the pixel electrodes, but also by the electric field between the main pixel region and the sub-pixel region, which further increases tilting speed of the liquid crystal molecules and reduces response time. In addition, the pixel electrode of the present invention only has a cross structure, there is a voltage difference between the main pixel region and the sub-pixel region, and the voltage difference is about 2V, so that dark streaks can be reduced or even nearly eliminated. Therefore, the liquid crystal efficiency and the display effect are improved.

The present invention also provides a display panel including any of the pixel electrodes described above.

The pixel electrode and the display panel of the present invention include a sub-pixel region and a main pixel region arranged at intervals. The sub-pixel region includes a first sub-pixel region and a second sub-pixel region, wherein a receiving chamber is formed between the first sub-pixel region and the second sub-pixel region, and the main pixel region is disposed in the receiving chamber. The sub-pixel region is positioned on both sides of the main pixel region, and there is a voltage difference between the main pixel region and the sub-pixel region so that the liquid crystal molecules in the middle region are not only affected by the electric field between the common voltage of the upper substrate and the pixel electrode, but also by the electric field between the main pixel region and the sub-pixel region. Furthermore, the tilting speed of the liquid crystal molecules is increased, the response time is shortened, and the viewing angles are also improved to improve the display effect.

As described above, although the present invention has been disclosed with the preferred embodiments, the preferred embodiments are not intended to limit the present invention. Those of ordinary skill in the art can make various modifications and decorations without departing from the spirit and scope of the present invention. Therefore, the protection scope of the present invention is subject to the scope defined by the claims.

What is claimed is:

1. A pixel electrode, comprising:
    a sub-pixel region and a main pixel region arranged at intervals, wherein the sub-pixel region comprises a first sub-pixel region and a second sub-pixel region, wherein a receiving chamber is formed between the first sub-pixel region and the second sub-pixel region, and wherein the main pixel region is defined in the receiving chamber; and
    a first body portion and a second body portion, wherein the first body portion is intersected with the second body portion, and the first body portion and at least a portion of the second body portion are disposed in the main pixel region;
    wherein the main pixel region comprises a first sub-region, a second sub-region, and a third sub-region, the first sub-region is disposed above the second body portion, the second sub-region is disposed below the second body portion, and the third sub-region comprises the second body portion, a plurality of branch portions, and a peripheral portion, wherein one end of one of the plurality of branch portions is connected to the second body portion, and the peripheral portion surrounds the second body portion and the plurality of branch portions.

2. The pixel electrode according to claim 1, wherein the first sub-pixel region and the second sub-pixel region both comprise a main sub-region and a secondary sub-region, the main sub-region is connected to a corresponding secondary sub-region and disposed above the second body portion, and the secondary sub-region is disposed below the second body portion.

3. The pixel electrode according to claim 1, wherein at least a part of the second body portion is positioned in the sub-pixel region.

4. The pixel electrode according to claim 3, wherein the second body portion comprises a first sub-portion and a second sub-portion, the first sub-portion is positioned in the first sub-pixel region, and the second sub-portion is positioned in the second sub-pixel region.

5. The pixel electrode according to claim 4, wherein the second body portion further comprises a third sub-portion, and the third sub-portion is positioned in the main pixel region.

6. The pixel electrode according to claim 1, wherein the main pixel region is symmetrical with respect to the first body portion or the second body portion, and the first sub-pixel region and the second sub-pixel region are symmetrical with respect to the first body portion.

7. The pixel electrode according to claim 1, wherein an area of the main pixel region is less than or equal to a sum of an area of the first sub-pixel region and an area of the second sub-pixel region.

8. The pixel electrode according to claim 1, wherein an area of the first sub-pixel region is equal to an area of the second sub-pixel region.

9. The pixel electrode according to claim 8, wherein an area of the main pixel region is equal to the area of the first sub-pixel region.

10. A display panel comprising a pixel electrode, wherein the pixel electrode comprises:
   a sub-pixel region and a main pixel region arranged at intervals, wherein the sub-pixel region comprises a first sub-pixel region and a second sub-pixel region, wherein a receiving chamber is formed between the first sub-pixel region and the second sub-pixel region, and wherein the main pixel region is defined in the receiving chamber; and
   a first body portion and a second body portion, wherein the first body portion is intersected with the second body portion, and the first body portion and at least a portion of the second body portion are disposed in the main pixel region;
   wherein the main pixel region comprises a first sub-region, a second sub-region, and a third sub-region, the first sub-region is disposed above the second body portion, the second sub-region is disposed below the second body portion, and the third sub-region comprises the second body portion, a plurality of branch portions, and a peripheral portion, wherein one end of one of the plurality of branch portions is connected to the second body portion, and the peripheral portion surrounds the second body portion and the plurality of branch portions.

11. The display panel according to claim 10, wherein the first sub-pixel region and the second sub-pixel region both comprise a main sub-region and a secondary sub-region, the main sub-region is connected to a corresponding secondary sub-region and disposed above the second body portion, and the secondary sub-region is disposed below the second body portion.

* * * * *